(12) United States Patent
Salume et al.

(10) Patent No.: US 10,708,704 B2
(45) Date of Patent: Jul. 7, 2020

(54) SPATIAL AUDIO FOR THREE-DIMENSIONAL DATA SETS

(71) Applicant: Microsoft Technology Licensing, LLC, Redmond, WA (US)

(72) Inventors: Diego E. Salume, Seattle, WA (US); Jason B. Scott, Newcastle, WA (US); Charles Tatsuya Sinex, Kirkland, WA (US); Richard Wifall, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/378,867

(22) Filed: Apr. 9, 2019

(65) Prior Publication Data

US 2019/0239014 A1    Aug. 1, 2019

Related U.S. Application Data

(63) Continuation of application No. 15/812,785, filed on Nov. 14, 2017, now Pat. No. 10,264,380.

(Continued)

(51) Int. Cl.
*H04S 3/00* (2006.01)
*G06F 3/01* (2006.01)
(Continued)

(52) U.S. Cl.
CPC ............. *H04S 3/002* (2013.01); *G06F 3/012* (2013.01); *G06F 3/017* (2013.01); *G06F 3/165* (2013.01);
(Continued)

(58) Field of Classification Search
CPC ...... H04S 3/002; H04S 7/304; H04S 2400/11; H04S 2400/15; H04S 3/00; H04S 7/00;
(Continued)

(56) References Cited

U.S. PATENT DOCUMENTS

2002/0151996 A1* 10/2002 Wilcock ................. G06F 3/167
700/94
2015/0373477 A1* 12/2015 Norris ...................... H04R 5/04
381/303

(Continued)

*Primary Examiner* — Xilin Guo
(74) *Attorney, Agent, or Firm* — Alleman Hall Creasman & Tuttle LLP

(57) ABSTRACT

A head mounted display (HMD) device is provided that includes a display, a position and orientation sensor, and speakers. The HMD device includes a processor configured to receive map data of a three-dimensional environment, receive a three-dimensional data set, detect a predefined feature in the three-dimensional data set, place a spatial audio emitter anchor in the three-dimensional environment in a location where the feature was detected, the spatial audio emitter having an emitter boundary, determine a current location of a user in the virtual environment based on a signal from the sensor, display the map data of the three-dimensional environment with a graphical representation of the three-dimensional data set based on the determined current location of the user, and responsive to determining that the location of the user is outside of the boundary, play the spatial audio emitter in a spatial audio mode via the near-ear speakers.

18 Claims, 10 Drawing Sheets

Related U.S. Application Data

(60) Provisional application No. 62/503,864, filed on May 9, 2017.

(51) Int. Cl.
*G06T 19/00* (2011.01)
*G06T 17/05* (2011.01)
*G06F 3/16* (2006.01)
*H04S 7/00* (2006.01)
*G06K 9/00* (2006.01)

(52) U.S. Cl.
CPC ......... *G06F 3/167* (2013.01); *G06K 9/00671* (2013.01); *G06T 17/05* (2013.01); *G06T 19/003* (2013.01); *H04S 7/304* (2013.01); *G06K 9/00637* (2013.01); *G06K 9/00651* (2013.01); *G06K 9/00657* (2013.01); *H04S 2400/11* (2013.01); *H04S 2400/15* (2013.01)

(58) Field of Classification Search
CPC .......... H04S 7/303; H04S 7/302; H04S 1/007; G06K 9/00671; G06K 9/00637; G06K 9/00657; G06K 9/00651; G06K 9/00; G06F 3/165; G06F 3/167; G06F 3/017; G06F 3/012; G06F 3/16; G06F 3/01; G06F 3/011; G06F 3/04815; G06T 19/00; G06T 17/05; G06T 19/003
See application file for complete search history.

(56) References Cited

U.S. PATENT DOCUMENTS

| | | | |
|---|---|---|---|
| 2016/0116298 A1* | 4/2016 | Clapper | G01C 21/3629 |
| | | | 701/428 |
| 2019/0149919 A1* | 5/2019 | Mate | G06F 3/167 |
| | | | 381/74 |

* cited by examiner

AUDIO SAMPLE LIBRARY 60

WIND SAMPLES

|  | 3D SPATIAL AUDIO | | 2D IMMERSIVE STEREO | |
|---|---|---|---|---|
|  | FORESTED | BARREN | FORESTED | BARREN |
| HEAVY | SAMPLE 1 | SAMPLE 4 | SAMPLE 7 | SAMPLE 10 |
| MEDIUM | SAMPLE 2 | SAMPLE 5 | SAMPLE 8 | SAMPLE 11 |
| LIGHT | SAMPLE 3 | SAMPLE 6 | SAMPLE 9 | SAMPLE 12 |

RAIN SAMPLES

|  | 3D SPATIAL AUDIO | | 2D IMMERSIVE STEREO | |
|---|---|---|---|---|
|  | OVER LAND | OVER WATER | OVER LAND | OVER WATER |
| HEAVY | SAMPLE 1 | SAMPLE 4 | SAMPLE 7 | SAMPLE 10 |
| MEDIUM | SAMPLE 2 | SAMPLE 5 | SAMPLE 8 | SAMPLE 11 |
| LIGHT | SAMPLE 3 | SAMPLE 6 | SAMPLE 9 | SAMPLE 12 |

THUNDER SAMPLES

|  | 3D SPATIAL AUDIO | | 2D IMMERSIVE STEREO | |
|---|---|---|---|---|
|  | OVER MOUNTAINS | OVER PLAINS | OVER MOUNTAINS | OVER PLAINS |
| HEAVY | SAMPLE 1 | SAMPLE 4 | SAMPLE 7 | SAMPLE 10 |
| MEDIUM | SAMPLE 2 | SAMPLE 5 | SAMPLE 8 | SAMPLE 11 |
| LIGHT | SAMPLE 3 | SAMPLE 6 | SAMPLE 9 | SAMPLE 12 |

TRAFFIC SAMPLES

|  | 3D SPATIAL AUDIO | | 2D IMMERSIVE STEREO | |
|---|---|---|---|---|
|  | LOCAL ROAD | HIGHWAY | LOCAL ROAD | HIGHWAY |
| HEAVY | SAMPLE 1 | SAMPLE 4 | SAMPLE 7 | SAMPLE 10 |
| MEDIUM | SAMPLE 2 | SAMPLE 5 | SAMPLE 8 | SAMPLE 11 |
| LIGHT | SAMPLE 3 | SAMPLE 6 | SAMPLE 9 | SAMPLE 12 |

CROWD SAMPLES

|  | 3D SPATIAL AUDIO | | 2D IMMERSIVE STEREO | |
|---|---|---|---|---|
|  | STADIUM | PARK | STADIUM | PARK |
| HEAVY | SAMPLE 1 | SAMPLE 4 | SAMPLE 7 | SAMPLE 10 |
| MEDIUM | SAMPLE 2 | SAMPLE 5 | SAMPLE 8 | SAMPLE 11 |
| LIGHT | SAMPLE 3 | SAMPLE 6 | SAMPLE 9 | SAMPLE 12 |

Fig. 2

SPATIAL AUDIO FOR THREE-DIMENSIONAL DATA SETS

CROSS REFERENCE TO RELATED APPLICATIONS

This application is a continuation of U.S. patent application Ser. No. 15/812,785, filed Nov. 14, 2017, which claims priority to U.S. Provisional Application No. 62/503,864 filed May 9, 2017, the entirety of each of which are hereby incorporated herein by reference.

BACKGROUND

Virtual reality and augmented reality platforms enable users to don a head mounted device and be immersed in vast virtual or mixed reality environments. When immersed in such an environment, the user can sometimes have difficulty processing the vast amounts of information that the user can perceive. As a result, it can be challenging for the user to easily identify and navigate to regions of interest.

SUMMARY

To address the above issue, a head mounted display device is provided that includes a display, a sensor configured to detect a position and orientation of a head of a user, and a pair of near-ear speakers. The head mounted display further includes a processor configured to receive map data of a three-dimensional environment, receive a three-dimensional data set, detect a predefined feature in the three-dimensional data set at a location within the three-dimensional environment, place a spatial audio emitter anchor in the three-dimensional environment in the location where the feature was detected, the spatial audio emitter having an emitter boundary surrounding the location, determine a current location of a user in the virtual environment based on a signal from the sensor, display the map data of the three-dimensional environment with a graphical representation of the three-dimensional data set based on the determined current location of the user, and responsive to determining that the location of the user is outside of the boundary, play the spatial audio emitter in a spatial audio mode via the near-ear speakers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a view of an example audio sample library of the computing system of FIG. 1.

DETAILED DESCRIPTION

Figure 1:
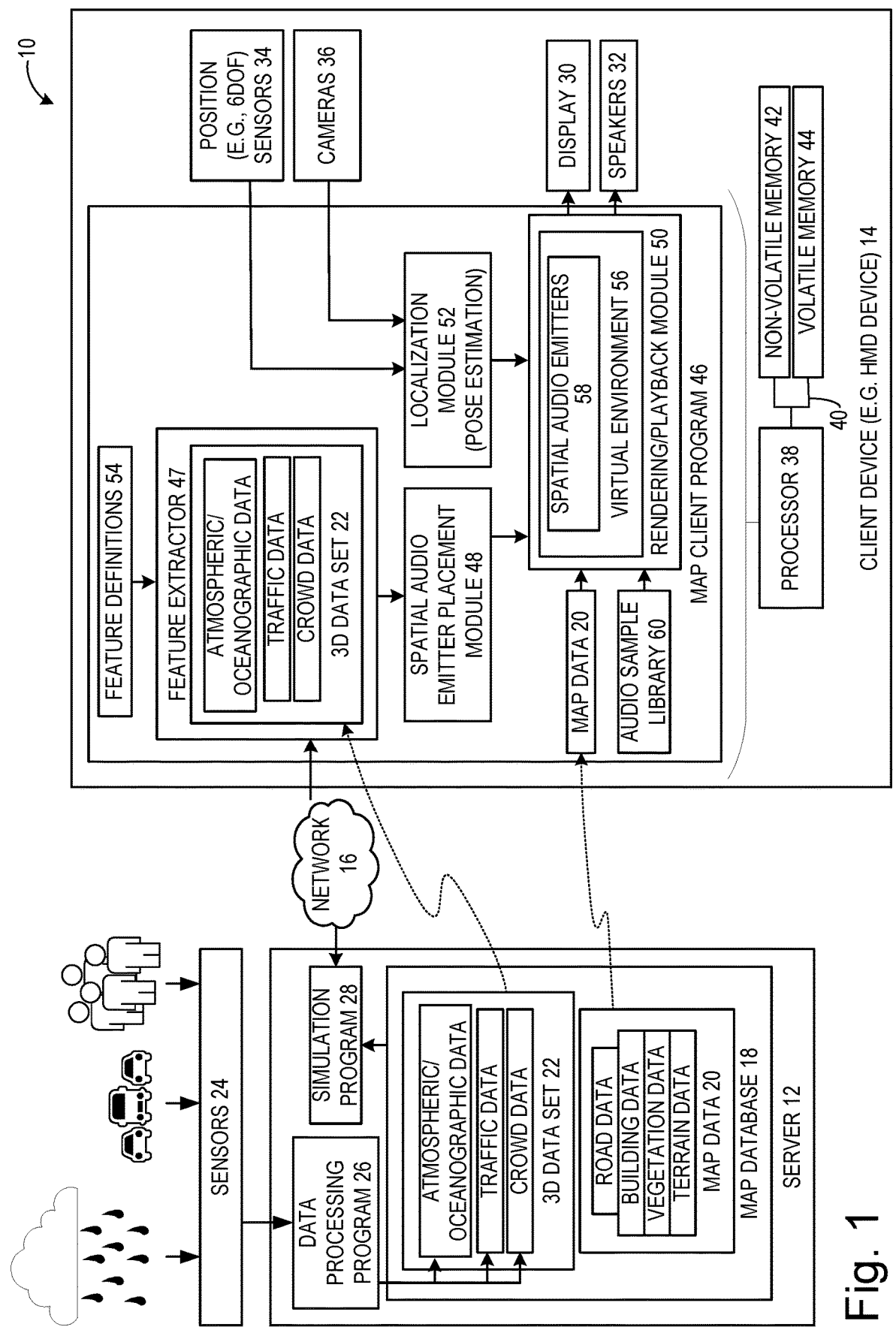
FIG. 1 is a schematic view of a computing system including a server and client device, according to one implementation of the present disclosure.

FIG. 1 illustrates a schematic view of a computing system 10 that utilizes spatial audio to help users explore three-dimensional data sets in a virtual reality environment. Computing system 10 includes a server 12 configured to serve a virtual reality environment to a client device 14 via a network 16, such as the Internet. Server 12 typically includes a map database 18, which contains map data 20. The map data 20 may include a variety of types of data, such as terrain data, vegetation data, three-dimensional building data, and road data. These types of data will be referred to herein as static map data, to contrast with dynamic three-dimensional data 22, which may be overlaid on the static map data. Dynamic three-dimensional data 22 includes atmospheric and oceanographic data, traffic data, crowd data, etc. While even the static map data may be subject to change, the rate of change occurs slowly, such as over months or years, as compared to dynamic three-dimensional data 22, which observably changes in real time at sample rates of several seconds, minutes, or hours. In many instances, the dynamic three-dimensional data may be represented as a vector field illustrating density, velocity, vorticity, or acceleration of a measured phenomenon, for example.

Dynamic three-dimensional data 22 is detected by sensors 24 positioned in the real world that measure observable natural phenomena. For atmospheric and oceanographic data, the sensors may take the form of temperature sensors, barometers, humidity sensors, wind speed sensor, wind direction sensor, rainfall sensors, wave height sensors, ocean current speed sensors, ocean current direction sensors, etc. For traffic data, the sensors 24 may include GPS sensors in smartphones or other electronic devices carried by users, which relay their position and velocity back a tracking server, which then computes traveling velocity and filters out data traveling too slow or in a region that is not a road, to be from a vehicle. This traffic data is made available by such servers for consumption by others. In the case of crowd data, the sensors also may be GPS sensors in smartphones or other electronic devices, with appropriate filtering to determine that a user is traveling at the pace of a human, to ensure the data represents pedestrians rather than users who are traveling in vehicles.

Server 12 is configured to receive data from sensors 24 and perform data processing via a data processing program 26 to generate the three-dimensional data set 22. Server 12 is also configured to execute a simulation program 28 that is configured to read the map data 20 and three-dimensional data set 22 and server to client device 14 data sufficient for the client device 14 to display a virtual environment in which the map data 20 and three-dimensional data set 22 are displayed.

Client device 14 may be a head mounted display (HMD) device, and the two will be referred to interchangeably below. The HMD device may include a near-eye display 30 and at least a pair of near-ear speakers 32. The term "near-ear speakers" refers to speakers formed integrally in the client device 14 and positioned in the vicinity of the ear by the client device 14 when the HMD device is worn by the user, as well as to over ear, on ear, and in-ear headphones that may be used in conjunction with the client device 14. The display typically includes sub-displays for each of the left eye and right eye, on which images are displayed using stereoscopic techniques to make objects in the images appear to the user to be positioned at a distance from the user in the virtual environment. The display may be at least partially see-through, so as to enable an augmented reality experience in which the user views holograms displayed on the display at the same time they view the real world through the see-through display. Or, the display may be fully opaque to provide an immersive, full virtual reality experience for the user.

The client device 14 may further include a position sensor 34 configured to detect a position and orientation of a head of a user wearing the client device 14. The position sensor may be, for example, an inertial motion unit that includes accelerometers and gyroscopes configured to detect its position and orientation 6 degrees of freedom (X, Y, and Z, pitch, roll and yaw). The position and orientation sensor 34 may also include a compass (e.g., a triaxial magnetometer) so that its bearing relative to a north-south meridian may be measured. Outwardly facing cameras 36 (including visible light cameras and depth cameras) may also be provided on the client device to capture images of the real environment. Image processing may be performed on the captured images to perform surface reconstruction and thereby generate a three-dimensional map of the real environment. Observations of features (such as edges and corners) present in successive captured images can augment position sensing as discussed below.

The client device 14 may further include a processor 38 connected via a bus 40 to non-volatile memory 42 and volatile memory 44. Software instructions to perform the various functions described herein may be stored in non-volatile memory 42, and executed by processor 38 using portions of volatile memory 44 at execution time.

The processor is configured to execute a map client program 46, which includes a feature extractor 47, a spatial audio emitter placement module 48, a rendering and playback module 50, and a localization module 52, among other software components. The feature extractor 47 is configured to receive a three-dimensional data set. As discussed above, the three-dimensional data set represents a phenomenon such as an atmospheric phenomenon, an oceanographic phenomenon, a crowd phenomenon, and a traffic phenomenon. The feature extractor 47 is further configured to detect a predefined feature in the three-dimensional data set at a location within a three-dimensional environment 56 rendered by the client device by matching observations in the data against a plurality of predefined feature definitions 54. For each detected feature, the spatial audio emitter placement module 48 is configured to place a spatial audio emitter 58 in the three-dimensional environment 56 in a location where the feature was detected.

Figure 4:
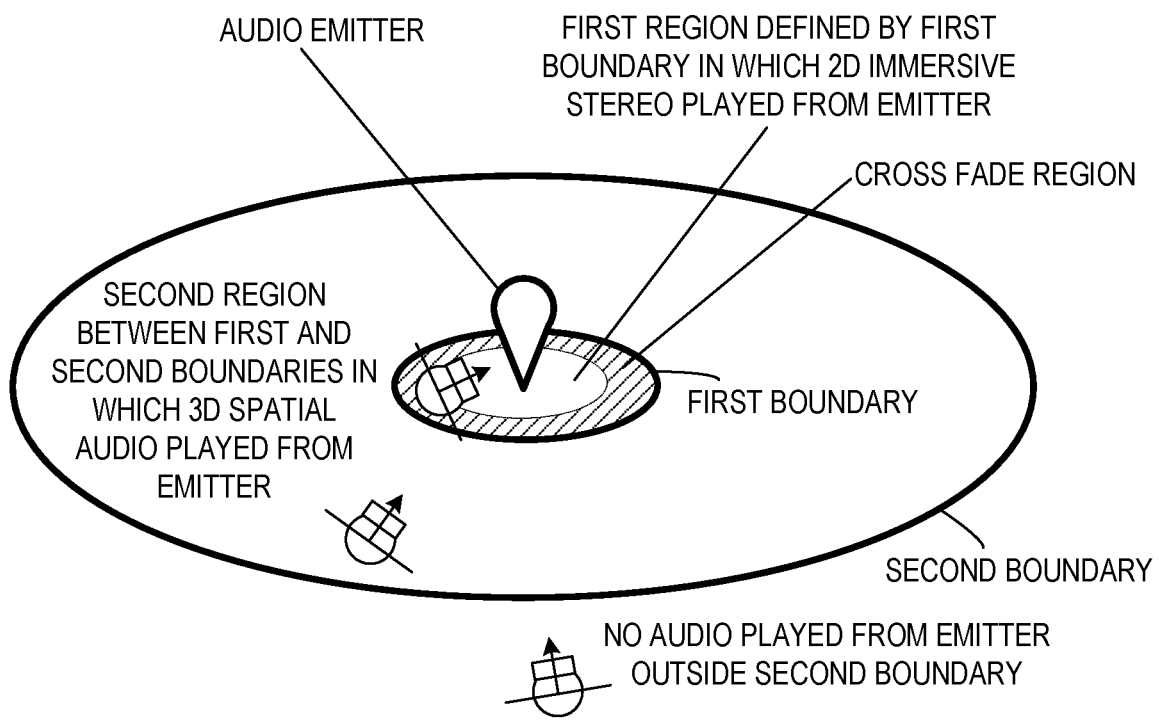
FIG. 4 is a schematic view of a spatial audio emitter and surrounding first and second boundaries and crossfade region, which define how the spatial audio emitter is played back.

As shown in FIG. 4, the spatial audio emitter 56 is typically placed a point location, and has an emitter boundary surrounding the location at which it is placed. The boundary is illustrated as a circle for ease of illustration, but typically is three dimensional. In one example, a cylinder may be used extending vertically from land to the sky, and in another example a sphere may be used for the shape of the boundary.

Returning to FIG. 1, the rendering and playback module 50 executed by the processor is configured to receive map data 22 of the three-dimensional environment 56 from the server 12, and is also configured to read audio samples from audio sample library 60. From this data, and the three-dimensional data set 22, the rendering and playback module 50 is configured to render graphically and playback sounds of the virtual environment 56 according to the position and orientation of the HMD device determined by the localization module 52 during pose estimation, which is performed as described below.

The localization module 52 executed by the processor 38 is configured to determine a current location of the HMD device worn by the user in the virtual environment based on a signal from the position sensor 34, and display on display 30 the map data of the three-dimensional environment 56 with a graphical representation of the three-dimensional data set 22 based on the determined current location and orientation of the user. In some implementations data from cameras 36 may be used to improve the accuracy of the estimated position and orientation of the user using a predictive corrective algorithm for position estimation with the camera data as feedback in the algorithm.

Responsive to determining that the location of the user is outside of the boundary, the rendering and playback module 50 executed by the processor is configured to play the spatial audio emitter in a spatial audio mode via the near-ear speakers. In this manner, when the user is outside the first boundary illustrated in FIG. 4, the spatial audio emitter is played. This provides an aural cue to the user that a region of interest in the three-dimensional data set is located some distance and away from the user in a given direction that the user can aurally ascertain. Typically, playing the spatial audio emitter in the spatial audio mode includes playing a mono audio sample back via the near-ear speakers after processing the audio sample using a head related transfer function based on the position and orientation of the head of the user sensed by the sensor. Thus, as the user's head moves back and forth in real time wearing the HMD device, the sensors detect the change in orientation, and apply the head related transfer function to process the mono audio sample and replay it via the pair of speakers 32 so that it is sensed by the user as originating from the location of the audio emitter in the virtual environment 56. In contrast, in the two-dimensional stereo mode, a stereo audio sample is typically played back without applying any head related transfer function, so that the played back sound for a particular emitter does not vary based on the orientation or position of the head of the user.

The rendering and playback module 50 may be configured to adjust a characteristic of audio played by the audio emitter. The audio characteristic that is adjusted may be, for example, an audio sample that is played back, an audio processing performed on the sample prior to playback, etc. The audio processing that is adjusted may be volume, reverberation, feedback, distortion, attenuation, speed, chorus, delay, echo, flanging, gating, or a combination thereof, as but a few examples.

Further, now referring to the above discussed predefined feature as a first predefined feature, the rendering and playback module 50 may be configured to detect an observation of a second predefined feature in map data 20 at a location proximate to the location of the first predefined feature in the first data set, and adjust a characteristic of audio played by the audio emitter based upon the detection of the first predefined feature and the second predefined feature. The second predefined feature may be detected in terrain data, building data, vegetation data, or road data of the map data 20, for example. In the example illustrated in FIG. 5, audio characteristics of audio emitters are adjusted for rain, wind and thunder based upon nearby terrain data and vegetation data in the map data 20, and audio characteristics of audio emitters for traffic and a crowd are adjusted based on their location in on a local road or highway and in a park or stadium as determined from road data and building data in map data 22.

Figure 5:
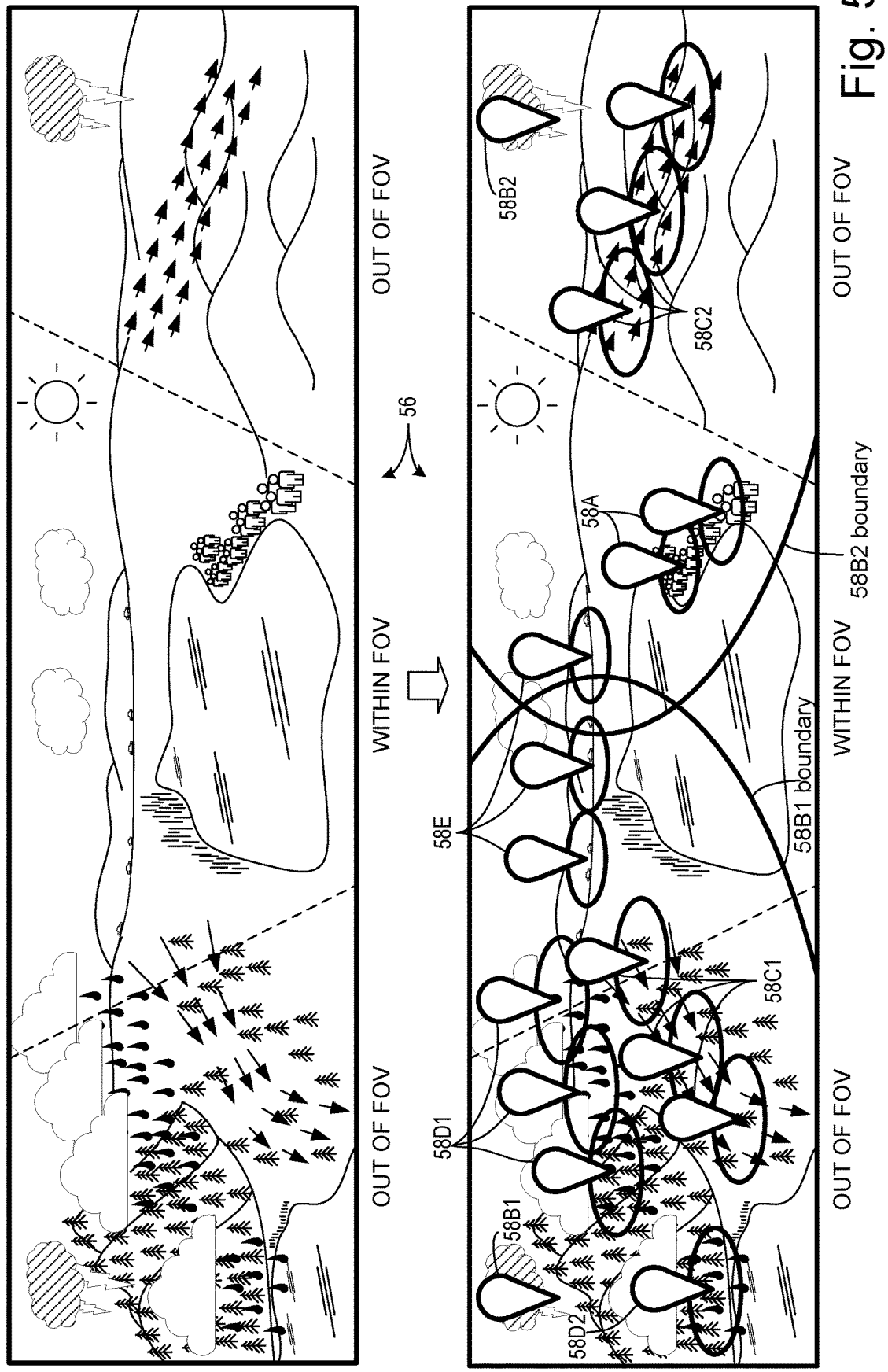
FIG. 5 is a view of a virtual environment displayed by the client device of the computing system of FIG. 1, showing the placement of a plurality of spatial audio emitters.

For example, the processor may be configured to adjust the characteristic of the audio played by the audio emitter by selecting the audio sample from among a plurality of audio samples based upon the detection of the first predefined feature and the second predefined feature. In the example of FIG. 5, different samples from audio sample library 60 are selected based upon the detection of the first predefined feature from the three-dimensional data set for atmospheric and oceanographic data (rain, wind, thunder), traffic data, and crowd data, as well as the second predefined feature from the terrain, road, building, and vegetation data in the map data 22, as discussed below.

FIG. 2 illustrates an example implementation of audio sample library. The illustrated audio sample library contains samples for each of a plurality of emitter types: namely, wind, rain, thunder, traffic, and crowd emitters. For each type of audio emitter, a plurality of samples are saved. For each type of emitter, a respective sample is saved for each of heavy, medium, and light conditions, under a plurality of map conditions, and for each of three-dimensional spatial audio reproduction and two-dimensional stereo reproduction. For wind, samples 1-3 for heavy, medium and light wind through a forested area, as detected from vegetation data in map data 22, and samples 4-6 are for heavy, medium, and light wind in a barren area devoid of vegetation, as detected from vegetation data in map data 22. Similarly, two-dimensional immersive stereo recordings are provided in samples 7-9 for a forested area, and samples 10-12 are provided for a barren area. Similarly, for rain samples played back via three-dimensional spatial audio, samples 1-3 are provided for heavy, medium and light conditions over land as detected from terrain data in map data 22, and samples 4-6 are rain sounds for rain occurring over a body of water such as a lake, river or ocean, as determined by terrain data in map data 22. Further, rain samples 7-9 are provided for two-dimensional immersive stereo playback of rain over land, and samples 7-10 are provided for such playback of rain over water. Similar thunder samples are also provided, with samples provided for both three-dimensional spatial audio and for two-dimensional immersive stereo playback for terrain conditions of over mountains or over plains. The location and intensity (heavy, medium or light) of the wind, rain and thunder are determined by feature extraction of the atmospheric and oceanographic data by feature extractor 47. The intensity may be computed a variety of ways. In the case of wind, for example, a maximum value of wind speed at a surface layer in a multi-layer atmosphere model within a predefined map quadrant may be used. When both wind and clouds are present, the system may assign a weather intensity value to each emitter by taking a maximum value within a surrounding region.

Similarly, for traffic on a local road or highway as determined by road data within map data 22, and for crowds of persons in a stadium or a park as determined by map data 22, audio samples are saved for heavy, medium and light conditions (density conditions in the crowd case, and congestion condition in the traffic example), for each of three-dimensional spatial audio playback and two-dimensional immersive stereo playback.

It will be appreciated that emitters which are close to each other may be combined for computational efficiency. To combine the emitters, the system may take a weighted average of the two intensity values for each emitter, based on the size (i.e., radius) of each emitter. The combined emitter typically has a size that encompasses both of the previous emitters, and a point location that is central to the point locations of the combined emitters. To prepare for playback of the combined emitter, the intensity values may be normalized on a 0-1 range, based on a predetermined maximum value for each particular emitter type (wind, rain, thunder, traffic, crowd, etc.). Then, if desired to further differentiate the emitter sounds across a lower range of intensity values (which may be more prevalent), a remapping function may be used. Specifically, for wind intensity, a remapping function similar to a logarithmic curve may be used, so that a lower range of wind speeds is mapped to a larger range of audio sounds.

In some scenarios, the weather condition intensity determined by the feature extractor 47 may be between a light intensity and a medium intensity, or between a medium intensity and a heavy intensity. In other scenarios, the extracted feature may have multiple location features and/or weather conditions. For example, an extracted feature may have both rain and wind weather conditions. In these scenarios, the processor may interpolate between two or more audio samples from the audio sample library to generate a suitable audio sample. For example, the processor may be configured to select two or more audio samples from among the plurality of audio samples based upon the detection of the first predefined feature and the second predefined feature, and adjust the characteristics of the audio played by the audio emitter based on a mix between the selected two or more audio samples. Thus, for an extracted feature that has both wind and rain weather conditions, the processor may select both wind and rain audio samples from the audio sample library 60 and adjust the characteristics of the audio played by the audio emitter based on a mix of the rain and wind audio samples. For an extracted feature that has a weather condition intensity that is between a light weather condition intensity and a medium weather condition intensity, the processor may select both the light and medium intensity audio samples for the particular weather feature and adjust the characteristics of the audio played by the audio emitter based on a mix of the light and medium intensity audio samples.

Figure 3:
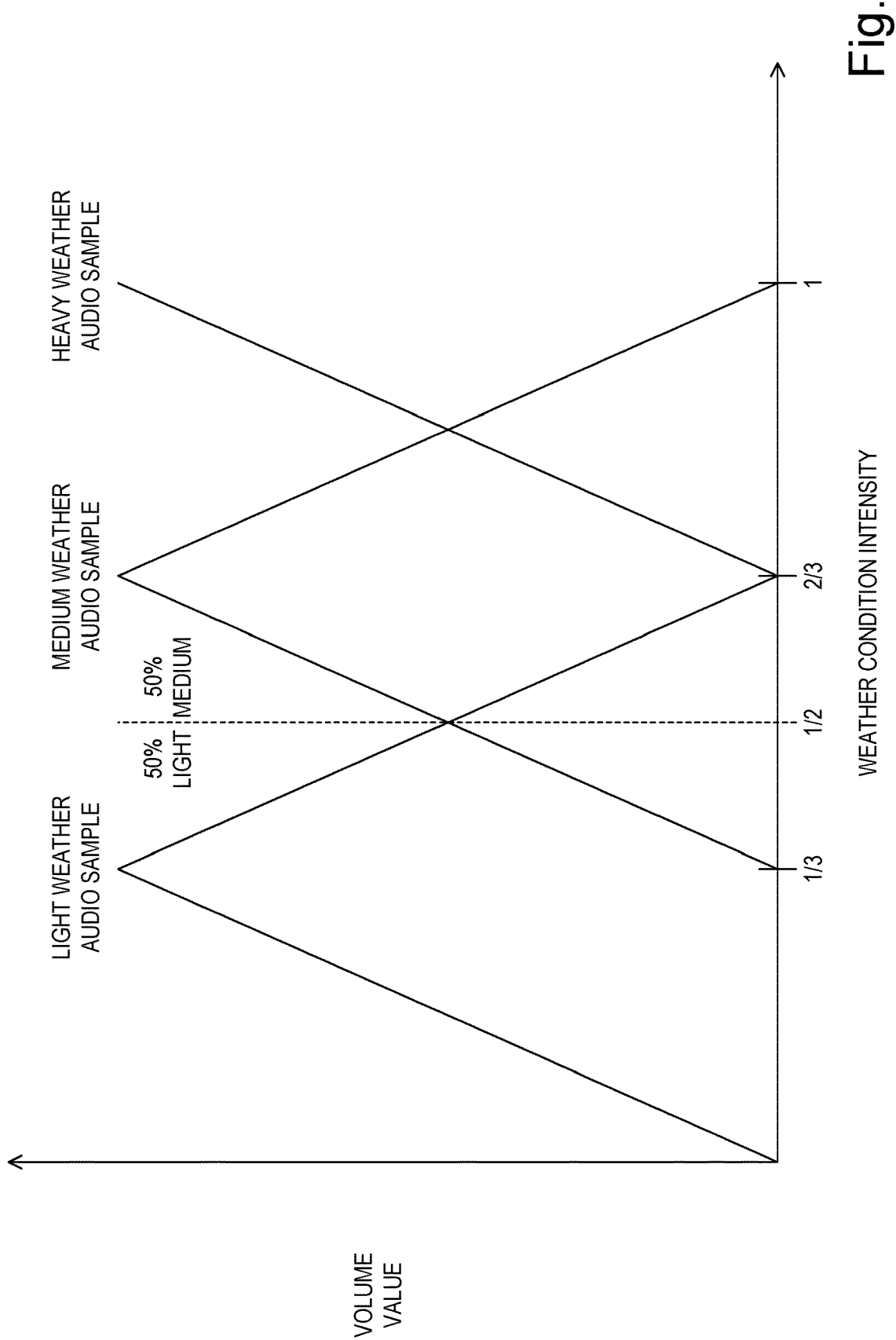
FIG. 3 is a graph depicting mixes of audio samples from the example audio sample library of FIG. 2.

FIG. 3 shows a graph depicting mixes between two or more weather condition intensity audio samples. In this example, the weather condition intensity value extracted by the feature extractor 47 is normalized to a value from 0 to 1. The characteristics of the audio played by the audio emitter may be adjusted for continuous intensity values across the normalized range from 0 to 1. For example, as shown in FIG. 3, a value of ⅓ may be considered light weather, a value of ⅔ may be considered medium weather, and a value of 1 may be considered heavy weather. For weather condition intensity values that lie between 0, ⅓, ⅔, and 1, the processor may interpolate between the light, medium, and heavy weather audio samples as shown in the graph of FIG. 3. As shown, for weather condition intensity values increasing from 0 to ⅓, the light weather audio sample may be played at increasing volume. For weather condition intensity values increasing from ⅓ to ⅔, the light weather audio sample may be played at decreasing volume while the medium weather audio sample is played at an increasing volume. For weather condition intensity values increasing from ⅔ to 1, the medium weather audio sample may be played at decreasing volume while the heavy weather audio sample is played at increasing volume. For example, at a weather condition intensity value of ½, the characteristics of the audio played by the audio emitter may be adjusted based on a 50-50 mix between the light weather audio sample and the medium weather audio sample. While FIG. 3 depicts an example of interpolating for weather condition intensities, it will be appreciated that a similar process may be used for interpolating for multiple location and/or weather conditions.

As shown in FIG. 4, each audio emitter typically has associated with it a first boundary encompassing the point location of the audio emitter. For users whose HMD device position in the virtual environment 56 is determined to be outside of the first boundary, the audio emitter is configured to play three-dimensional spatial audio in a three-dimensional spatial audio mode, using three-dimensional audio samples from the audio sample library 60. Thus, the recording and playback module 50 is configured to, responsive to determining that the location of the user is outside of the first boundary, play the spatial audio emitter in a spatial audio mode via the near-ear speakers 32.

For users whose client device 14 in the form of an HMD device is determined to be positioned within a first region within the first boundary in the virtual environment 56, the audio emitter may be configured to play two-dimensional immersive stereo in a stereo mode, using samples selected from the two-dimensional audio samples for the audio emitter type within the audio sample library 60. Thus, as the client device 14 position is detected as transitioning from the second region to the first region, the recording and playback module 50 is configured to, responsive to determining that the current location of the user is inside the first boundary, cease playing the spatial audio emitter in spatial audio mode, and commence playing the spatial audio emitter in a two-dimensional immersive stereo mode. If desired, a crossfade region may be provided at or around the first boundary, and the transition between two-dimensional stereo in the first region and three-dimensional spatial audio in the second region may be accomplished by crossfading the two types of audio as the user's HMD device position traverses the crossfade region. Thus, the ceasing and the commencing of playback discussed above may be accomplished gradually according to a crossfade between the spatial audio mode and stereo mode that is executed in the crossfade region proximate the boundary.

Each audio emitter may also have a second boundary encompassing the first boundary and defining a second region between the first and second boundaries, within which the three-dimensional spatial audio is played, and wherein no audio is played by the emitter when the users HMD device position in the virtual environment is determined to be outside the second boundary. Thus, responsive to determining that a current location of the HMD device of the user is outside of the second boundary in the virtual environment, the recording and playback module 50 will cease to play the spatial audio emitter.

Turning now to FIG. 5, one example of virtual environment 56 displayed by the client device of the computing system of FIG. 1 is shown, with a plurality of spatial audio emitters 58 placed throughout. Five types of audio emitters 58 are shown in this example: wind audio emitters, rain audio emitters, lighting audio emitters, traffic audio emitters, and crowd audio emitters. The first boundary (i.e., the boundary between two-dimensional stereo and three-dimensional spatial audio playback) for each emitter is also shown. It will be noted that the boundaries are smaller for human crowd emitters 58A, and larger for thunder emitters 58B. This is due to the fact that thunder is a sound that is perceived even at great distances without directionality by the user, while human crowd noise is generally of less volume and fairly directional as compared to thunder. Further, although the remaining first boundaries for the audio emitters are generally sized similarly, it will be appreciated that first boundaries are sized in relative to the virtual environment, in a unit such as feet or meters. Thus, similarly sized boundaries will appear smaller in the distance than up close, due to perspective, although this effect is not greatly illustrated in FIG. 5. From the perspective of FIG. 5, the current position of the user is outside of all of the first boundaries of the depicted audio emitters, and thus for all audio emitters the user should be hearing three-dimensional spatial audio. Second boundaries, which define the limits of playback for the spatial audio, are not illustrated in the example of FIG. 5.

Comparing now the thunder audio emitter 58B1 on the left with that on the right, the left-side thunder audio emitter 58B1 is positioned nearby mountains, while the right-side thunder audio emitter 58B2 is positioned nearby open plains. These positions were determined by spatial audio emitter placement module 48, which detected a medium lightning strike feature (a first predetermined feature) on the right side and a light lightning strike feature on the left side (another first predetermined feature) in the atmospheric and oceanographic data within the map data 22 and placed audio emitters 58B1, 58B2 in the location of the strikes. Next, the recording and playback module 50 is configured to detect that mountainous terrain (a second predetermined feature) nearby the left-side thunder audio emitter 58B1 and open plains terrain (another second predetermined feature) nearby the right-side thunder audio emitter 58B2. Given the medium lighting strike feature in open plains terrain and the user's position outside the first boundary for the emitter 58B2, the recording and playback module 50 is configured to select sample 5 (as indicated in bold in FIG. 2) from the thunder samples saved in audio sample library 60 and play this back in a spatial audio mode. Similarly, given the light lightning strike feature in mountainous terrain for the spatial audio emitter 58B1 and the user's position outside the first boundary for spatial audio emitter 58B1, the recording and playback module 50 is configured to select sample 3 (also indicated in bold in FIG. 2) for playback. Were the user to move inside the first boundaries for spatial audio emitters 58B1 or 58B2, then thunder samples 9 and 11, respectively, would be played back in two-dimensional immersive stereo.

Similarly, for wind audio emitters 58C1, 58C2, these emitters were placed by spatial audio emitter placement module 48 after detection of wind speeds exceeding predetermined thresholds for heavy wind (in the case of 58C1) and light wind (in the case of 58C2). For audio emitters 58C2, the recording and playback module 50 recognizes the user's current position as outside the boundary for these emitters, determines that these emitters are for light wind, examines vegetation data within map data 22 and determines that these emitters are positioned near barren land, and accordingly selects wind sample 6 (indicated in bold in FIG. 2), for light wind over barren land for playback by audio emitters 58C2. Similarly, for audio emitters 58C1, the recording and playback module 50 determines that these audio emitters are for heavy wind and are near forested terrain, and accordingly selects wind sample 1 (also shown in bold in FIG. 2) for playback by emitters 58C1.

Audio emitters 58D1, 58D2 were placed by spatial audio emitter module 48 after feature extractor 47 has detected data values matching a feature definition for medium rain within the atmospheric and oceanographic data in the locations shown. The recording and playback module 50 determines that audio emitters 58D1 for medium rain are located over land, whereas audio emitter 58D2 for medium rain is located over water. Accordingly, rain sample 2 and rain sample 3 are selected for playback in the spatial audio mode by audio emitters 58D1 and 58D2, respectively, as shown in bold in FIG. 2.

Audio emitters 58E have been placed to emit traffic sounds. These audio emitters are placed by spatial audio emitter placement module after detecting the presence of roads in map data 22, and also after the feature extractor 47 has detected data meeting a feature definition for medium traffic on the road depicted in the virtual environment 56. The recording and playback module 50 identifies that the road traveled on by the traffic is a local road, and that the traffic is medium in intensity, and thus selects sample 2 (shown in bold in FIG. 2) for playback by audio emitters 58E in the spatial audio mode.

Audio emitters 58A have been placed by spatial audio emitter placement module 48 following detection by feature extractor 47 of crowds of light intensity in the crowd data of map data 22. The recording and playback module 50 is configured to select sample 6 (shown in bold in FIG. 2) upon determining that the locations of the audio emitters 58A are in a park setting rather than a stadium setting, by examining building data and terrain data in map data 20.

In the above manner, the various spatial audio emitters in FIG. 5 may be played back to the user via near-ear speakers in a client device such as a head-mounted display device. As the user views the virtual environment 56, it will be appreciated that the user's view is limited to the field of view within the dashed lines. Thus, the spatial audio emitters serve not only to indicate to the user the presence of a region of interest within the user's field of view, such as with crowd audio emitters 58A and traffic audio emitters 58E, but also to indicate the presence of regions of interest outside the field of view, such as are present in locations of audio emitters 58B1, 58B2, 58C1, 58C2, 58D1 and 58D2. The user, hearing the spatial audio for rain falling on water, wind rustling through trees, and thunder rolling over mountains may be prompted to explore regions to the left-hand side of the FIG. 5, or hearing the spatial audio for thunder rolling over plains and wind blowing over barren land, may be prompted to explore regions to the right-hand side of FIG. 5. In this way, the user's awareness both of conditions outside and within of the user's field of view can be improved.

Figure 6:
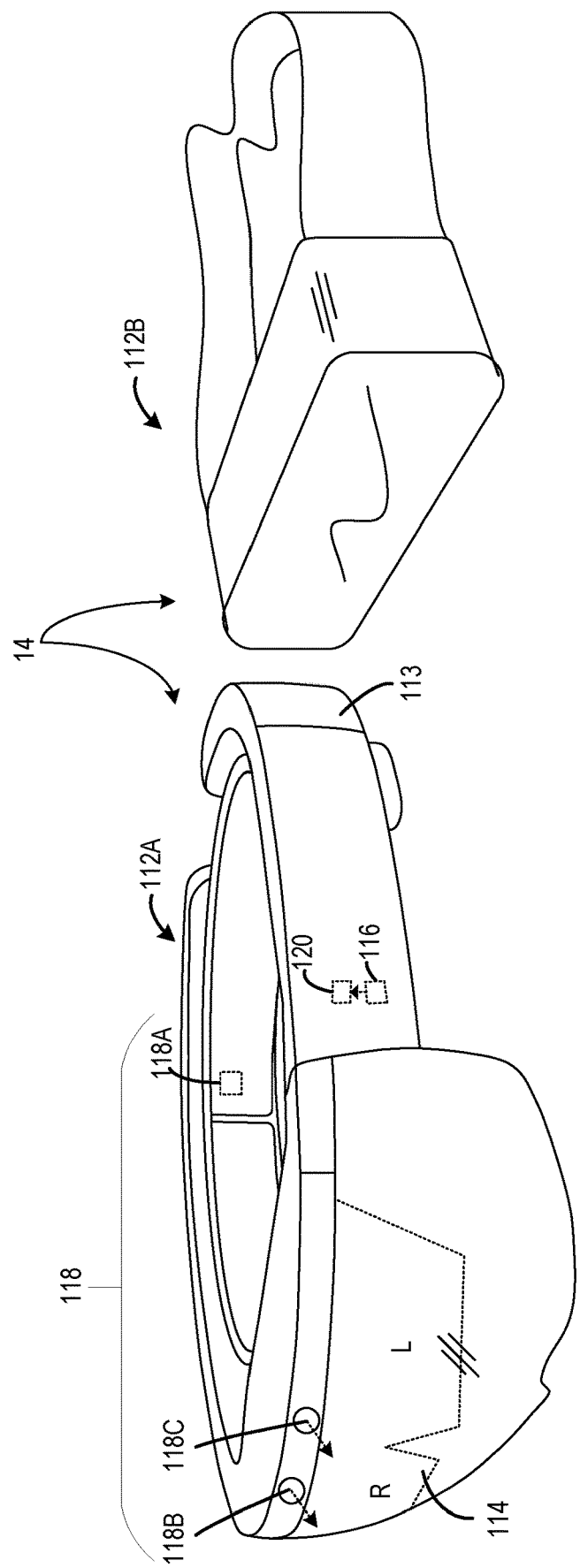
FIG. 6 is a view of an augmented reality HMD device and a virtual reality HMD device that may be used as the client device of the computing system of FIG. 1.

FIG. 6 illustrates two examples of HMD devices that can be used as client device 14. The two examples of HMD devices include augmented reality HMD device 112A that includes an at least partially transparent display and a virtual reality HMD device 112B that includes an opaque, non-see-through display. It will be appreciated that the following descriptions of sensors and systems may apply to both the augmented reality HMD device 112A and the virtual reality HMD device 112B.

In the example of FIG. 6, the each of the example HMD devices has a construction that includes a frame 113 that wraps around the head of the user to position a display 114 close to the user's eyes. The frame supports additional components of the augmented reality HMD device, such as, for example, a processor 116 and input devices 118. The processor 116 includes logic and associated computer memory configured to provide image signals to the display 114, to receive sensory signals from input devices 118, and to enact various control processes described herein. The frame of virtual reality HMD device 112B includes a rigid portion and an elastic portion, whereas the frame of augmented reality HMD device 112A is substantially rigid around its circumference.

Various suitable display technologies and configurations may be used to display images via the display 114. For example, in virtual reality HMD device 112B, the display 114 may be an opaque display, such as a non-see-through Light-Emitting Diode (LED) display, a Liquid Crystal Display (LCD), or any other suitable type of opaque or otherwise non-see-through display. In augmented reality HMD device 112A, the display 114 may be a transparent display that is configured to enable a wearer of the augmented reality HMD device 112A to view physical, real-world objects in the physical environment through one or more partially transparent pixels displaying virtual object representations. For example, the display 114 may include image-producing elements such as, for example, a see-through Organic Light-Emitting Diode (OLED) display. As another example of a transparent display, the augmented reality HMD device 112A may include a light modulator on an edge of the display 114. In this example, the display 114 may serve as a light guide for delivering light from the light modulator to the eyes of a wearer. In other examples, the display 114 may utilize a liquid crystal on silicon (LCOS) display. The display 114 may include both a left L and right R display in a stereoscopic display configuration. The left L and right R displays each display a view of an augmented reality scene from the perspective of the user's corresponding eye. By viewing the augmented reality scene through the left L and right R displays, the user will perceive virtual objects as being located at particular depths in the real world.

The input devices 118 may include various sensors and related systems to provide information to the processor 116. Such sensors may include, but are not limited to, an inertial measurement unit (IMU) 118A, one or more image sensors 118B, and one or more ambient light sensors 118C. The one or more outward facing image sensors 118B may be configured to capture and/or measure physical environment attributes of the physical environment in which the augmented reality HMD device 110A is located. In one example, the one or more image sensors 118B may include a visible-light camera configured to collect a visible-light image of a physical space.

In one example of the augmented reality HMD device 112A that includes a display 114 having a transparent display type, the position and/or orientation of the augmented reality HMD device 112A relative to the physical environment may be assessed so that augmented-reality images may be accurately displayed in desired real-world locations with desired orientations. In both augmented reality HMD device 10A and virtual reality HMD device 112B, the IMU 118A of the two example HMD devices may be configured to provide position and/or orientation data of the two example HMD devices to the processor 116. The orientation derived from the sensor signals of the IMU may be used to display, via the display 14, one or more holographic images with a realistic and stable position and orientation.

The processor 116 may include a logic processor and the two example HMD devices may include volatile memory and non-volatile storage, as discussed in more detail below with respect to the example computing system 500 of FIG. 9, in communication with the display 114 and the various sensors of input devices 118.

It will be appreciated that the simulation program 28 on server 12 may be configured to send map data in phases to the client device, such that map data 20 for a region immediately surrounding a current location of the user is initially sent, and later map data 20 for a surrounding region is sent. Further, the map data 20 may be sent in layers, such that map data 20 only certain map layers (e.g., terrain and roads) is initially sent, and other layers (e.g., traffic, vegetation, and buildings) is sent later. Further, the map data 20 may be sent in varying degrees of resolution, such that low resolution map data 20 is initially sent from the server to the client and displayed to a user, followed by higher resolution map data 20. In each of these scenarios, the feature extractor 47 of the client device 14 may be configured to first run feature extraction on an initial set of map data 20 (such as the map data 20 as initially received), and the spatial audio emitter placement module 48 may be configured to place an initial set of audio emitters for playback to the user. At a later suitable time, the feature extractor 47 may be configured to extract a second set of features from map data 20 (such as map data 20 later received, or map data 20 not otherwise initially processed). Using appropriate program logic, the feature extractor 47 might extract features for the Seattle, Wash. region, to cause audio emitters to be placed for the Seattle, Wash. region as a user initially begins to explore this region. However, after a period of time passes, the program logic might place audio emitters for features extracted from nearby regions of high interest, such as Portland, Oreg. In this way, the user's attention might be grabbed by the aural cues from the Portland-based emitters, and the user might navigate to explore the Portland region.

Further, while in the above embodiments the playback of sounds associated with the spatial audio emitters has been discussed, it should be appreciated that graphical elements may also be displayed at the location of each spatial audio emitter, based on program logic, user preference settings, etc. In the depicted implementation of FIG. 5, such graphical elements are shown as pins and boundary graphics. Although these were meant for ease of illustration in FIG. 5, it should be appreciated that they may be visibly presented as well, if desired. In this way, a user may be provided with an aural and also graphical cue as to the existence and location of a nearby region of interest. Finally, the spatial audio emitters may not only emit spatial audio, but may emit haptic feedback (e.g., vibrations, wind, heat, mist, etc.) through haptic feedback mechanisms such as vibrators, fans, heaters/air conditioners, misters, etc. associated with the client device, and/or audio sounds that are not directional, such as extremely low frequency sounds. In this way, the user's sense of touch may also be stimulated by the emissions of the spatial audio emitter.

Further, while the above embodiments are configured to display the map data of the three-dimensional environment with a graphical representation of the three-dimensional data set via a display of the client device 14, it should be appreciated that the processes and methods described herein related to detected predefined features, detecting a location of the user, and placement and playback of spatial audio emitters may be performed by the client device 14 without displaying the map data or graphical representations. In such an implementation the client device 14 may be a set of speakers or a pair of headphones, for example.

Figure 7:
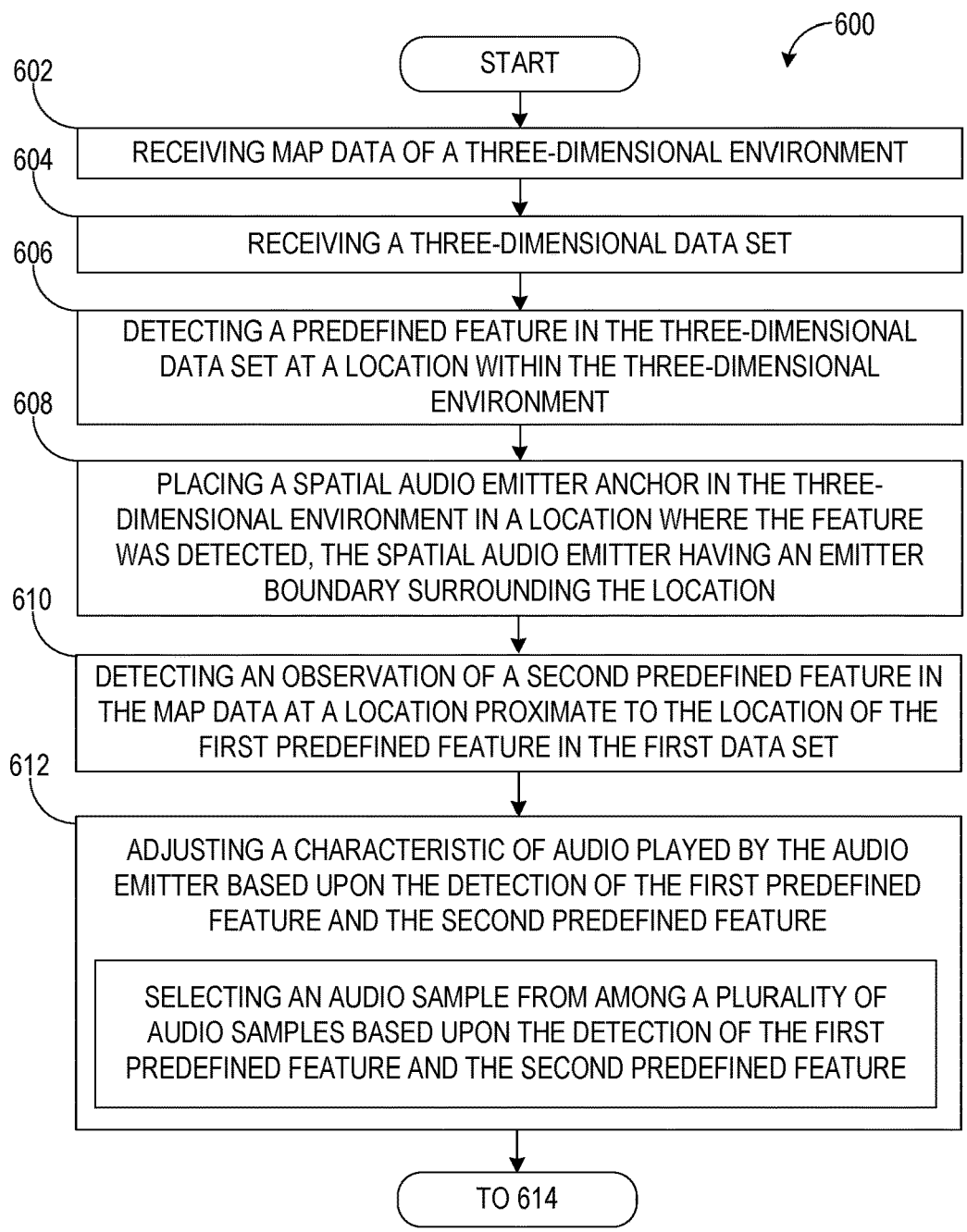
FIG. 7 is a flowchart illustrating a method for playing spatial audio emitters implemented by the computing system of FIG. 1.

FIG. 7 shows a flowchart illustrating an example method 600. Method 600 may be implemented at a processor of a computing device, such as the head mounted display device described herein, for example. In another example, the computing device may include one or more external input devices, one or more external output devices, and one or more external display devices communicatively coupled to the computing device and configured to implement the method 600 and the processes described herein.

At 602, method 600 may include receiving map data of a three-dimensional environment. The map data 20 may include a variety of types of data, such as terrain data, vegetation data, three-dimensional building data, and road data. In another example, the map data 20 may include dynamic three-dimensional data 22 including atmospheric and oceanographic data, traffic data, crowd data, etc. In many instances, the dynamic three-dimensional data may be represented as a vector field illustrating density, velocity, vorticity, or acceleration of a measured phenomenon, for example.

At 604, method 600 may include receiving a three-dimensional data set. In one example, the three-dimensional data set represents a phenomenon selected from the group consisting of an atmospheric phenomenon, an oceanographic phenomenon, a crowd phenomenon, and a traffic phenomenon.

At 606, method 600 may include detecting a predefined feature in the three-dimensional data set at a location within the three-dimensional environment. For example, the predefined feature may be detected for atmospheric and oceanographic data (rain, wind, thunder), traffic data, and crowd data, as well as terrain, road, building, and vegetation data in the map data 22, as a few non-limiting examples.

At 608, the method 600 may include placing a spatial audio emitter anchor in the three-dimensional environment in a location where the feature was detected, the spatial audio emitter having an emitter boundary surrounding the location. The spatial audio emitter 56 is typically placed at a point location, and has an emitter boundary surrounding the location at which it is placed. The emitter boundary may typically encompass a three dimensional area, such as, for example, a cylinder that extends vertically from land to the sky, a sphere that extends from the point location, or another three-dimensional shape.

In one example, the predefined feature is a first predefined feature, and the processor may be configured to detect a plurality of predefined features. At 610, the method 600 may include detecting an observation of a second predefined feature in the map data at a location proximate to the location of the first predefined feature in the first data set. In this example, the second predefined feature may be detected by the processor of the computing device implementing the method 600 from terrain data, building data, vegetation data, or road data in the map data.

At 612, the method 600 may include adjusting a characteristic of audio played by the audio emitter based upon the detection of the first predefined feature and the second predefined feature. In one example, at 612, adjusting the characteristic of the audio played by the audio emitter may be achieved by selecting an audio sample from among a plurality of audio samples based upon the detection of the first predefined feature and the second predefined feature. For example, different samples from audio sample library 60 may be selected by the processor of the computing device implementing the method 600 based upon the detection of the first predefined feature from the three-dimensional data set for atmospheric and oceanographic data (rain, wind, thunder), traffic data, and crowd data, as well as the second predefined feature from the terrain, road, building, and vegetation data in the map data 22.

Figure 8:
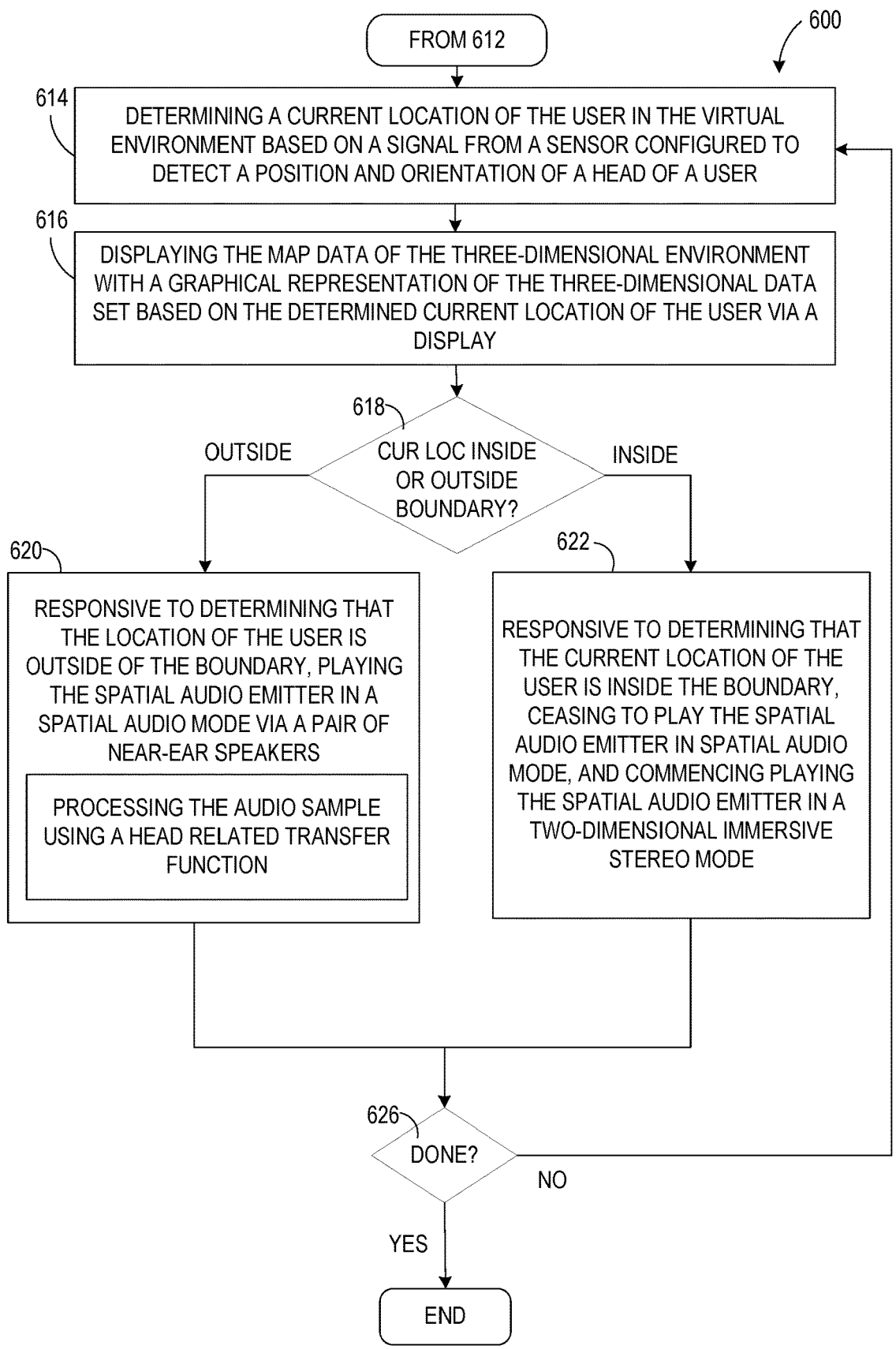
FIG. 8 continues the flowchart of FIG. 7.

The flowchart of the method 600 is continued in FIG. 8. At 614, the method 600 may include determining a current location of the user in the virtual environment based on a signal from a sensor configured to detect a position and orientation of a head of a user. The position sensor may be, for example, an inertial motion unit that includes accelerometers and gyroscopes configured to detect its position and orientation 6 degrees of freedom (X, Y, and Z, pitch, roll and yaw). The position and orientation sensor 34 may also include a compass (e.g., a triaxial magnetometer) so that its bearing relative to a north-south meridian may be measured. However, it will be appreciated that other types of sensors may be used to detect the position and orientation of the head of the user. For example, the sensor may take the form of an external sensor that is not included in a head mounted display device configuration of the computing device. The external sensor may be configured to capture images of the user, and the processor may be configured to perform image analysis to detect the position and orientation of the head of the user.

The current location of the user, including the detected position and orientation of the head of the user, may be continually tracked by the processor of the computing device implementing the method 600 as the user moves through the three-dimensional environment. At 616, the method 600 may include displaying the map data of the three-dimensional environment with a graphical representation of the three-dimensional data set based on the determined current location of the user via a display. Various suitable display technologies and configurations may be used to display the map data of the three-dimensional environment and the graphical representation of the three-dimensional data set via the display 114. For example, in virtual reality HMD device 112B, the display 114 may be an opaque display, such as a non-see-through Light-Emitting Diode (LED) display, a Liquid Crystal Display (LCD), or any other suitable type of opaque or otherwise non-see-through display. In augmented reality HMD device 112A, the display 114 may be a transparent display that is configured to enable a wearer of the augmented reality HMD device 112A to view physical, real-world objects in the physical environment through one or more partially transparent pixels displaying virtual object representations. In another example, the map data of the three-dimensional environment and the graphical representation of the three-dimensional data set may be presented via one or more displays that are not included in a head mounted display device configuration of the computing device.

As the location of the user and the position and orientation of the user's head is tracked, the processor of the computing device implementing the method 600 may include comparing the user's current location including the detected position and orientation of the user's head with the boundaries of the placed spatial audio emitters. At 618, the method 600 may include comparing the current location of the user and the position and orientation of the user's head relative to the boundary of the placed spatial audio emitter, and determining whether the user is outside or inside the first boundary.

At 620, the method 600 may include, responsive to determining that the location of the user is outside of the boundary, playing the spatial audio emitter in a spatial audio mode via a pair of near-ear speakers. In one example, at 620 of method 600, playing the spatial audio emitter in the spatial audio mode may include playing a mono audio sample back via the near-ear speakers after processing the audio sample using a head related transfer function based on the position and orientation of the head of the user sensed by the sensor. Thus, as the user's head moves back and forth in real time, the sensors of the computing device implementing the method 600 detect the change in orientation, and the processor of the computing device may apply the head related transfer function to process the mono audio sample and replay it via the pair of speakers 32, for example, so that it is sensed by the user as originating from the location of the audio emitter in the virtual environment 56. In other example, the spatial audio emitter may be played via external audio devices that are not included in a head mounted display device configuration of the computing device. For example, the spatial audio emitter may be played back via one or more speakers configured to output spatial audio to the user.

On the other hand, at 622, the method 600 may include, responsive to determining that the current location of the user is inside the boundary, ceasing to play the spatial audio emitter in spatial audio mode, and commencing playing the spatial audio emitter in a two-dimensional immersive stereo mode. In one example, a crossfade region may be provided at or around the first boundary, and the transition between two-dimensional stereo in the first region and three-dimensional spatial audio in the second region may be accomplished by crossfading the two types of audio as the user's position traverses the crossfade region. Thus, the ceasing and the commencing of playback discussed above may be accomplished gradually according to a crossfade between the spatial audio mode and stereo mode that is executed in the crossfade region proximate the boundary.

At 626, the method 600 may include determining whether to reiterate through steps 614 to 626. As illustrated in the flowchart shown in FIG. 8, the method 600 may continue to iterate though steps 614 to 626, and thus continue to track a current location of the user and a position and orientation of the head of the user, update the displayed map data of the three-dimensional environment and the graphical representation of the three-dimensional data set based on the user's updated location, compare the user's updated location to boundaries of spatial audio emitters placed in the three-dimensional environment, and determine whether to play a nearby spatial audio emitter in a spatial audio mode or a two-dimensional immersive stereo mode, or cease playing that spatial audio emitter.

Figure 8A:
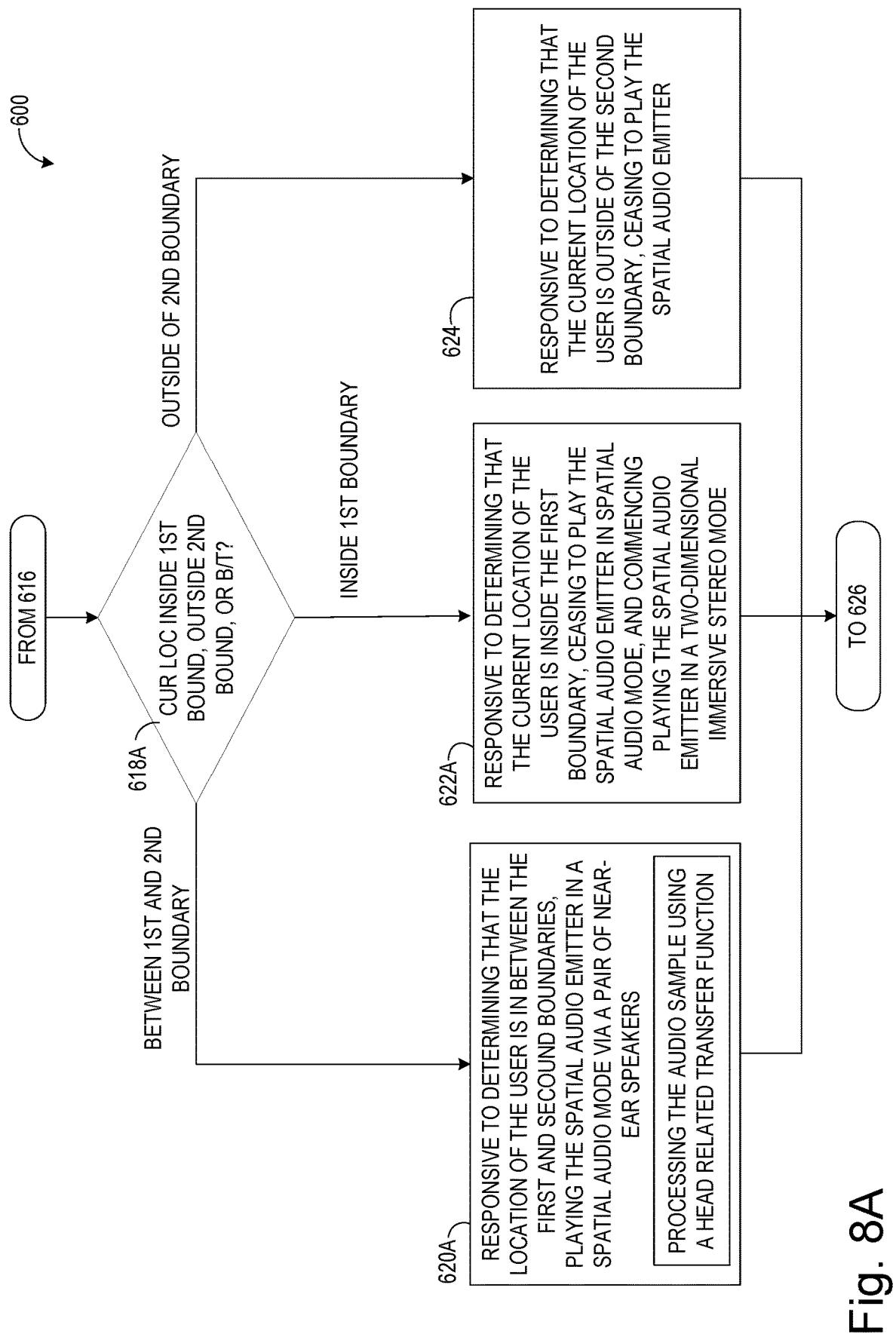
FIG. 8A shows alternative method steps for the flowchart of FIG. 8.

FIG. 8A shows a flowchart for additional or alternative steps of method 600 between steps 616 and 626. As discussed above, the spatial audio emitter has an emitter boundary surrounding the location that the spatial audio emitter was placed. In one example, the boundary is a first boundary defining a first region encompassing the audio emitter, and the audio emitter further includes a second boundary encompassing the first boundary and defining a second region between the first boundary and the second boundary. Thus, proceeding from step 616 to alternative step 618A, the method 600 may include comparing the user's current location including the detected position and orientation of the user's head relative to the first and second boundaries of the placed spatial audio emitters, and determining whether the user is inside the first boundary, in between the first and second boundaries, or outside the second boundary.

At alternative step 620A, the method 600 may include, responsive to determining that the location of the user is between of the first and second boundaries, playing the spatial audio emitter in a spatial audio mode via a pair of near-ear speakers.

At alternative step 622A, the method 600 may include, responsive to determining that the current location of the user is inside the first boundary, ceasing to play the spatial audio emitter in spatial audio mode, and commencing playing the spatial audio emitter in a two-dimensional immersive stereo mode.

At alternative step 624, the method 600 may include, responsive to determining that the current location of the user is outside of the second boundary, ceasing to play the spatial audio emitter.

As illustrated in FIG. 8A, all three of these branching steps may advance to step 626 illustrated in FIG. 8. It will be appreciated that the method 600 may advance through the steps shown in FIG. 8 and/or the alternative steps shown in FIG. 8A, depending on whether a placed spatial audio emitter includes one boundary or two boundaries.

Figure 9:
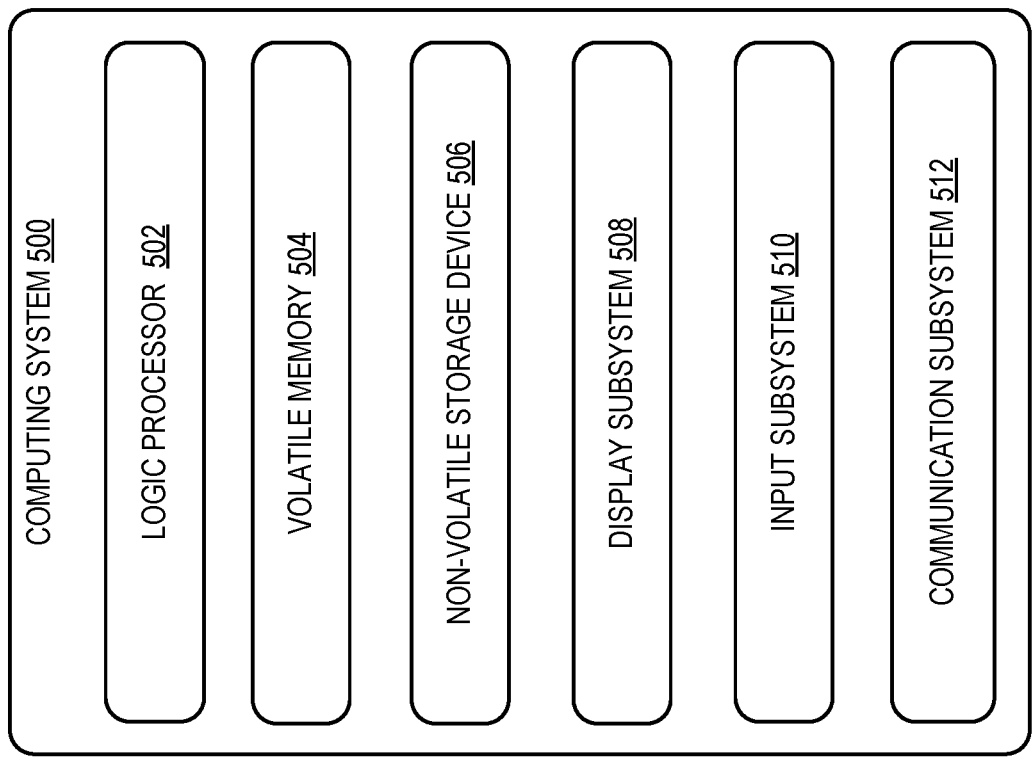
FIG. 9 is a schematic view of an example computing environment in which the computing system of FIG. 1 may be enacted.

FIG. 9 schematically shows a non-limiting embodiment of a computing system 500 that can enact one or more of the methods and processes described above. Computing system 500 is shown in simplified form. Computing system 500 may embody the two example HMD devices 10 described above. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 9.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 504 may be transformed—e.g., to hold different data.

Non-volatile storage device 506 may include physical devices that are removable and/or built-in. Non-volatile storage device 504 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FP GAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The following paragraphs provide additional support for the claims of the subject application. One aspect provides a head mounted display device, comprising a display, a sensor configured to detect a position and orientation of a head of a user, a pair of near-ear speakers, and a processor configured to receive map data of a three-dimensional environment, receive a three-dimensional data set, detect a predefined feature in the three-dimensional data set at a location within the three-dimensional environment, place a spatial audio emitter anchor in the three-dimensional environment in a location where the feature was detected, the spatial audio emitter having an emitter boundary surrounding the location, determine a current location of the user in the virtual environment based on a signal from the sensor, display the map data of the three-dimensional environment with a graphical representation of the three-dimensional data set based on the determined current location of the user, and responsive to determining that the location of the user is outside of the boundary, play the spatial audio emitter in a spatial audio mode via the near-ear speakers. In this aspect, additionally or alternatively, playing the spatial audio emitter in the spatial audio mode may include playing a mono audio sample back via the near-ear speakers after processing the audio sample using a head related transfer function based on the position and orientation of the head of the user sensed by the sensor. In this aspect, additionally or alternatively, the three-dimensional data set may represent a phenomenon selected from the group consisting of an atmospheric phenomenon, an oceanographic phenomenon, a crowd phenomenon, and a traffic phenomenon. In this aspect, additionally or alternatively, the processor may be configured to adjust a characteristic of audio played by the audio emitter. In this aspect, additionally or alternatively, the predefined feature may be a first predefined feature, and the processor may be further configured to detect an observation of a second predefined feature in the map data at a location proximate to the location of the first predefined feature in the first data set, and adjust a characteristic of audio played by the audio emitter based upon the detection of the first predefined feature and the second predefined feature. In this aspect, additionally or alternatively, the second predefined feature may be detected from terrain data, building data, vegetation data, or road data in the map data. In this aspect, additionally or alternatively, the processor may be configured to adjust the characteristic of the audio played by the audio emitter by selecting an audio sample from among a plurality of audio samples based upon the detection of the first predefined feature and the second predefined feature. In this aspect, additionally or alternatively, the processor may be configured to select two or more audio samples from among the plurality of audio samples based upon the detection of the first predefined feature and the second predefined feature, and adjust the characteristics of the audio played by the audio emitter based on a mix between the selected two or more audio samples. In this aspect, additionally or alternatively, the boundary may be a first boundary defining a first region encompassing the audio emitter, and the audio emitter may further include a second boundary encompassing the first boundary and defining a second region between the first boundary and the second boundary, and the processor may be further configured to responsive to determining that the current location of the user is outside of the second boundary, ceasing to play the spatial audio emitter. In this aspect, additionally or alternatively, the processor may be further configured to responsive to determining that the current location of the user is inside the boundary, ceasing to play the spatial audio emitter in spatial audio mode, and commencing playing the spatial audio emitter in a two-dimensional immersive stereo mode. In this aspect, additionally or alternatively, the ceasing and the commencing may be accomplished according to a crossfade between the spatial audio mode and stereo mode that is executed in a crossfade region proximate the boundary.

Another aspect provides a method, comprising, at a processor of a computing device, receiving map data of a three-dimensional environment, receiving a three-dimensional data set, detecting a predefined feature in the three-dimensional data set at a location within the three-dimensional environment, placing a spatial audio emitter anchor in the three-dimensional environment in a location where the feature was detected, the spatial audio emitter having an emitter boundary surrounding the location, determining a current location of the user in the virtual environment based on a signal from a sensor configured to detect a position and orientation of a head of a user, displaying the map data of the three-dimensional environment with a graphical representation of the three-dimensional data set based on the determined current location of the user via a display, and responsive to determining that the location of the user is outside of the boundary, playing the spatial audio emitter in a spatial audio mode via a pair of near-ear speakers. In this aspect, additionally or alternatively, playing the spatial audio emitter in the spatial audio mode may include playing a mono audio sample back via the near-ear speakers after processing the audio sample using a head related transfer function based on the position and orientation of the head of the user sensed by the sensor. In this aspect, additionally or alternatively, the three-dimensional data set may represent a phenomenon selected from the group consisting of an atmospheric phenomenon, an oceanographic phenomenon, a crowd phenomenon, and a traffic phenomenon. In this aspect, additionally or alternatively, the method may further comprise adjusting a characteristic of audio played by the audio emitter. In this aspect, additionally or alternatively, the predefined feature may be a first predefined feature, and the method may further comprise detecting an observation of a second predefined feature in the map data at a location proximate to the location of the first predefined feature in the first data set, and adjusting a characteristic of audio played by the audio emitter based upon the detection of the first predefined feature and the second predefined feature. In this aspect, additionally or alternatively, the second predefined feature may be detected from terrain data, building data, vegetation data, or road data in the map data. In this aspect, additionally or alternatively, the method may further comprise adjusting the characteristic of the audio played by the audio emitter by selecting an audio sample from among a plurality of audio samples based upon the detection of the first predefined feature and the second predefined feature. In this aspect, additionally or alternatively, the boundary may be a first boundary defining a first region encompassing the audio emitter, and the audio emitter may further include a second boundary encompassing the first boundary and defining a second region between the first boundary and the second boundary, and the method may further comprise, responsive to determining that the current location of the user is outside of the second boundary, ceasing to play the spatial audio emitter. In this aspect, additionally or alternatively, the method may further comprise, responsive to determining that the current location of the user is inside the boundary, ceasing to play the spatial audio emitter in spatial audio mode, and commencing playing the spatial audio emitter in a two-dimensional immersive stereo mode.

Another aspect provides a computing device comprising a sensor configured to detect a position and orientation of a head of a user, a pair of near-ear speakers, and a processor configured to receive map data of a three-dimensional environment, receive a three-dimensional data set, detect a predefined feature in the three-dimensional data set at a location within the three-dimensional environment, place a spatial audio emitter anchor in the three-dimensional environment in a location where the feature was detected, the spatial audio emitter having an emitter boundary surrounding the location, determine a current location of the user in three-dimensional environment based on a signal from the sensor, and responsive to determining that the location of the user is outside of the boundary, play the spatial audio emitter in a spatial audio mode via the near-ear speakers.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head mounted display device, comprising:
    a display;
    one or more sensors configured to detect a position and orientation of a head of a user;
    a pair of near-ear speakers; and
    a processor configured to:
        receive map data of a three-dimensional environment;
        receive a three-dimensional data set;
        detect a first feature in the three-dimensional data set at a location within the three-dimensional environment, the first feature being associated with a spatial audio emitter anchor at the location;
        detect an observation of a second feature in the map data at a location proximate to the location of the first feature in the three-dimensional data set;
        adjust a characteristic of audio played by the audio emitter based upon the detection of the first feature and the second feature;
        determine a current position and orientation of the head of the user in the three-dimensional environment based on a signal from the one or more sensors;
        display the map data of the three-dimensional environment with a graphical representation of the three-dimensional data set based on the determined current position and orientation of the head of the user; and
        play the spatial audio emitter via the near-ear speakers based on the current position and orientation of the head of the user relative to the location of the spatial audio emitter anchor.

2. The head mounted display device of claim 1, wherein the three-dimensional data set represents a phenomenon selected from the group consisting of an atmospheric phenomenon, an oceanographic phenomenon, a crowd phenomenon, and a traffic phenomenon.

3. The head mounted display device of claim 1, wherein the processor is configured to:
    adjust a characteristic of audio played by the audio emitter.

4. The head mounted display device of claim 1, wherein the second feature is detected from terrain data, building data, vegetation data, or road data in the map data.

5. The head mounted display device of claim 1, wherein the processor is configured to adjust the characteristic of the audio played by the audio emitter by selecting an audio sample from among a plurality of audio samples based upon the detection of the first feature and the second feature.

6. The head mounted display device of claim 5, wherein the processor is configured to select two or more audio samples from among the plurality of audio samples based upon the detection of the first feature and the second feature, and adjust the characteristics of the audio played by the audio emitter based on a mix between the selected two or more audio samples.

7. The head mounted display device of claim 1, wherein the spatial audio emitter includes a first boundary defining a first region encompassing the audio emitter, and a second boundary encompassing the first boundary and defining a second region between the first boundary and the second boundary, and wherein the processor is further configured to:
    responsive to determining that the current position and orientation of the head of the user is outside of the first boundary and inside the second boundary, play the spatial audio emitter in a spatial audio mode via the near-ear speakers; and
    responsive to determining that the current position and orientation of the head of the user is outside of the second boundary, ceasing to play the spatial audio emitter.

8. The head mounted display device of claim 7, wherein playing the spatial audio emitter in the spatial audio mode includes playing a mono audio sample back via the near-ear speakers after processing the audio sample using a head related transfer function based on the position and orientation of the head of the user sensed by the sensor.

9. The head mounted display of claim 7, wherein the processor is further configured to:

responsive to determining that the current position and orientation of the head of the user is inside the first boundary, ceasing to play the spatial audio emitter in spatial audio mode, and commencing playing the spatial audio emitter in a two-dimensional immersive stereo mode.

10. The head mounted display of claim 9, wherein the ceasing and the commencing are accomplished according to a crossfade between the spatial audio mode and stereo mode that is executed in a crossfade region proximate the first boundary.

11. A method, comprising:
at a processor of a computing device:
receiving map data of a three-dimensional environment;
receiving a three-dimensional data set;
detecting a first feature in the three-dimensional data set at a location within the three-dimensional environment, the first feature being associated with a spatial audio emitter anchor at the location;
detecting an observation of a second feature in the map data at a location proximate to the location of the first feature in the three-dimensional data set;
adjusting a characteristic of audio played by the audio emitter based upon the detection of the first feature and the second feature;
determining a current position and orientation of a head of the user in the three-dimensional environment based on a signal from one or more sensors;
displaying the map data of the three-dimensional environment with a graphical representation of the three-dimensional data set based on the determined current position and orientation of the head of the user via a display; and
playing the spatial audio emitter via a pair of near-ear speakers based on the current position and orientation of the head of the user relative to the location of the spatial audio emitter anchor.

12. The method of claim 11, wherein the three-dimensional data set represents a phenomenon selected from the group consisting of an atmospheric phenomenon, an oceanographic phenomenon, a crowd phenomenon, and a traffic phenomenon.

13. The method of claim 11, further comprising adjusting a characteristic of audio played by the audio emitter.

14. The method of claim 11, wherein the second feature is detected from terrain data, building data, vegetation data, or road data in the map data.

15. The method of claim 11, wherein the method further comprises adjusting the characteristic of the audio played by the audio emitter by selecting an audio sample from among a plurality of audio samples based upon the detection of the first feature and the second feature.

16. The method of claim 11, wherein the spatial audio emitter includes a first boundary defining a first region encompassing the audio emitter, and a second boundary encompassing the first boundary and defining a second region between the first boundary and the second boundary, and wherein the method further comprises:
responsive to determining that the current position and orientation of the head of the user is outside of the first boundary and inside second boundary, playing the spatial audio emitter in a spatial audio mode;
responsive to determining that the current position and orientation of the head of the user is outside of the second boundary, ceasing to play the spatial audio emitter; and
responsive to determining that the current position and orientation of the head of the user is inside the first boundary, ceasing to play the spatial audio emitter in spatial audio mode, and commencing playing the spatial audio emitter in a two-dimensional immersive stereo mode.

17. The method of claim 16, wherein playing the spatial audio emitter in the spatial audio mode includes playing a mono audio sample back via the near-ear speakers after processing the audio sample using a head related transfer function based on the position and orientation of the head of the user sensed by the sensor.

18. A computing device comprising:
one or more sensors configured to detect a position and orientation of a head of a user;
one or more speakers; and
a processor configured to:
receive map data of a three-dimensional environment;
receive a three-dimensional data set;
detect a first feature in the three-dimensional data set at a location within the three-dimensional environment, the first feature being associated with a spatial audio emitter anchor at the location;
detect an observation of a second feature in the map data at a location proximate to the location of the first feature in the three-dimensional data set;
adjust a characteristic of audio played by the audio emitter based upon the detection of the first feature and the second feature;
determine a current position and orientation of the head of the user in three-dimensional environment based on a signal from the one or more sensor; and
play the spatial audio emitter via the one or more speakers based on the current position and orientation of the head of the user relative to the location of the spatial audio emitter anchor.

* * * * *